Oct. 17, 1961  A. SCHAUS  3,004,827
TREATMENT OF BY-PRODUCT GYPSUM
Filed Dec. 31, 1956  2 Sheets-Sheet 1

INVENTOR.
ARTHUR SCHAUS
BY Robert R. Finch
Attorney

Oct. 17, 1961 A. SCHAUS 3,004,827
TREATMENT OF BY-PRODUCT GYPSUM
Filed Dec. 31, 1956 2 Sheets-Sheet 2

INVENTOR.
ARTHUR SCHAUS
BY Robert R. Finch
Attorney

3,004,827
TREATMENT OF BY-PRODUCT GYPSUM
Arthur Schaus, Brussels, Belgium, assignor to Dorr-Oliver Incorporated, Stamford, Conn., a corporation of Delaware
Filed Dec. 31, 1956, Ser. No. 631,778
3 Claims. (Cl. 23—122)

This invention relates to the treatment of gypsum to render it suitable for the production of ammonium sulfate by the well-known reaction between gypsum and ammonium carbonate in hydrochemical process. More particularly the invention concerns itself with an improved process and apparatus arrangement which enables economical use of by-product gypsum yielded in the strong wet phosphoric acid process for the production of ammonium sulfate.

In the production of phosphoric acid by reaction between phosphate rock and strong sulfuric acid, the solid by-product is gypsum or calcium sulfate dihydrate $$(CaSO_4 \cdot 2H_2O)$$

In the normal acid process, the acid and gypsum finally occur as a slurry which is filtered to recover the acid. The gypsum filter cake is either discarded or may be converted to ammonium sulfate by the known reaction with ammonium carbonate.

In processes heretofore employed for converting by-product gypsum into ammonium sulfate, considerable difficulty has been experienced due to impurities contained in the by-product gypsum. Such impurities include relatively large quantities of such substances as organic matter, gelatinous silica, insoluble fluorine compounds and a certain percentage of undesirable extremely fine calcium sulfate crystals. Such impurities are objectionable for a variety of reasons. In the first place, they render filtering of the acid slurry difficult in that they reduce the filtration rate and also limit the minimum moisture content of the filter cake to a low of about 25% to 35% moisture, depending on the composition of the phosphate rock used and the average particle size of the calcium sulphate crystals produced. This filtering difficulty results in some loss of acid. Moreover, to get proper washing of the cake it is necessary to use hot water, a factor which substantially increases the cost price of the phosphoric acid product.

The above mentioned impurities, especially the silica-fluorine compounds, exert a retardant effect on the reaction between ammonium carbonate and gypsum thus increasing the cost price of the ammonium sulfate product. Another problem due to the presence of these impurities is that they are carried through the gypsum conversion process and report at the final filtration step involving the separation of calcium carbonate precipitate from ammonium sulfate solution where they contribute to the same problems of filtration as are encountered in the acid filtration step namely, lower filterability and a high moisture content of the filter cake, the latter increasing the cost of evaporating the ammonium sulfate solution to obtain crystallization of the ammonium sulfate salt since washing is minimized.

A further problem due directly to the presence of the above mentioned impurities is that the by-product gypsum contains some residual soluble $P_2O_5$ which may be as high as 0.4% by weight of the gypsum dry basis. Such $P_2O_5$ reacts with calcium sulfate to yield insoluble tri-calcium phosphate, a compound which due to its gelatinous state tends to reduce even more the filterability of the calcium carbonate ammonium sulfate solution.

As mentioned above, the gypsum produced in the acid process contains a minor quantity of extremely fine gypsum crystals. Due to increased reaction velocity these fines result in the formation of extremely fine calcium carbonate particles in the gypsum-ammonium carbonate reaction, which, in turn, interferes with subsequent filtration of the reaction slurry.

In view of the foregoing, it is obvious that ways and means which will simultaneously remove the impurities and extremely fine gypsum crystals from the gypsum prior to reaction with ammonium carbonate will solve a number of major problems.

It is therefore a primary object of the present invention to provide ways and means for economically treating by-product gypsum produced in the strong phosphoric acid process to condition it for subsequent conversion into ammonium sulfate. Another important object of the invention is to increase the yield of phosphoric acid in the strong acid process while concomitantly reducing the overall cost of the acid produced.

A further object is to increase the filterability of the gypsum and its dehydration to a minimum final moisture content and subsequently to increase by the same way the filterability and the dehydrating ability of the calcium carbonate precipitate formed in the gypsum conversion reaction, both factors tending to substantially reduce the evaporation cost of the ammonium sulfate solution produced. A still further object is to provide ways and means for recovering residual soluble $P_2O_5$ from the gypsum for return to the acid process. Still another and related object is to utilize residual soluble $P_2O_5$ as an aid in clarifying turbid liquors finally discharged from the gypsum classification system.

The foregoing and other objects are attained in accordance with this invention by subjecting the by-product gypsum from the phosphoric acid process to hydraulic classification by which the above discussed impurities and fine gypsum crystals are simultaneously removed from suspension. Thus, the present invention revolves about my fundamental discovery that, unexpectedly, such hydraulic classification results in substantially complete removal of the solid fluorine compounds along with other impurities. Removal of the solid fluorine compounds is unexpected because of the fact that they are relatively large crystals being much larger than the other impurities and, in fact, very nearly as large as the desired product size gypsum crystals.

The resulting classified gypsum crystals unexpectedly have increased filterability, and may be easily de-watered to a residual moisture content as low as 16% to 20% depending on the average crystal size of the washed gypsum. This provides a considerable savings in filtering and also in subsequent evaporation for drying product ammonium sulfate crystals.

Residual soluble $P_2O_5$ contained in the by-product gypsum is largely removed during the hydraulic classification step in the form of a dilute solution of phosphoric acid and returned to the acid section for washing purposes. Hence this feature results in a substantial saving of $P_2O_5$ which may amount to 0.4% by weight of the product gypsum.

In order that the invention may be readily understood and carried into effect, reference is made to the accompanying diagrammatical flowsheets which illustrate preferred embodiments of the invention. It is to be understood, however, that the following description is to be taken as illustrative only and not limiting of the invention, the scope of which is defined by the appended claims rather than by the description preceding them. It is also to be noted that the invention is not confined to the use of hydrocyclones to effect classification, but may be carried out in any of a number of hydraulic classifiers in which liquid flow effects classification such as the well known teeter column or hindered settling technique.

Figure 1:
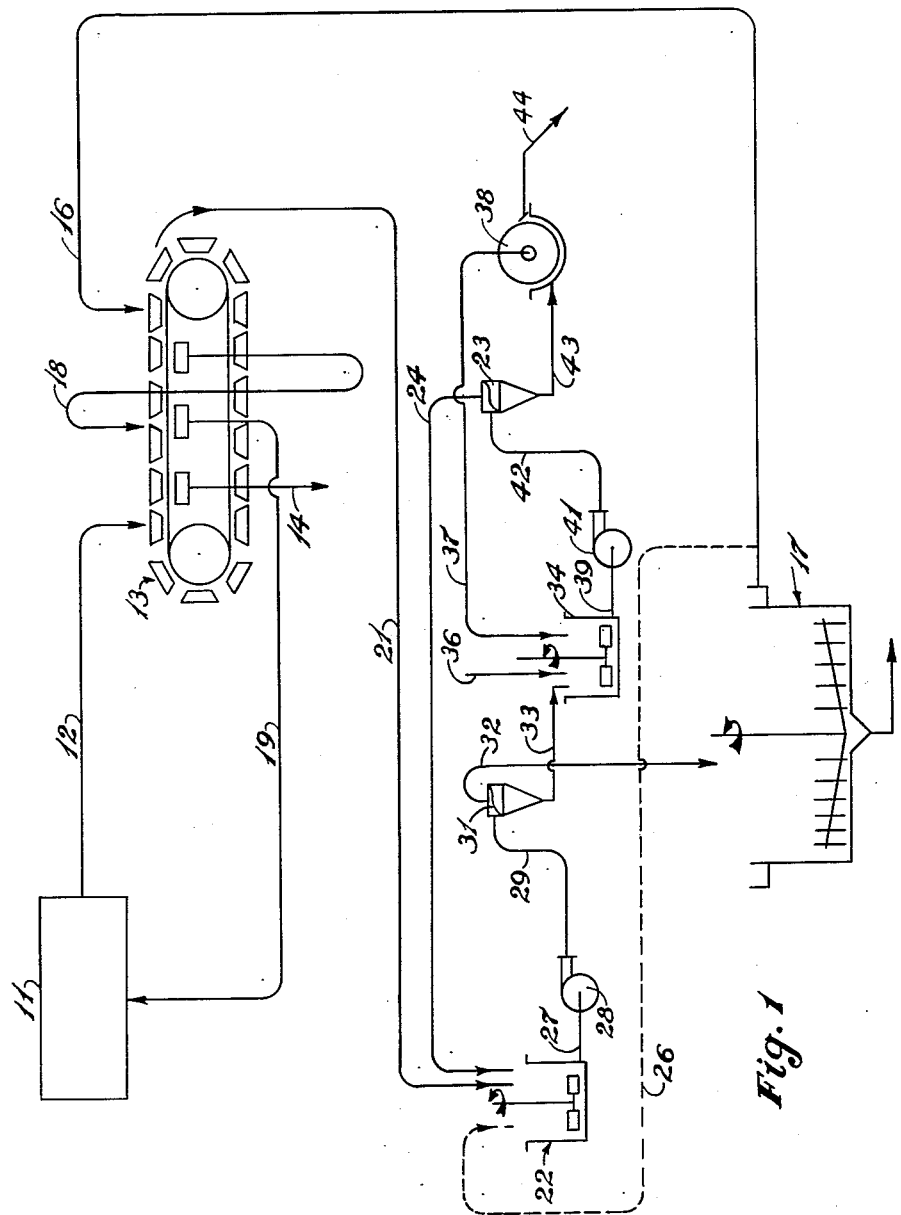
FIGURE 1 illustrates a preferred flowsheet in which hydraulic classification of the by-product gypsum is carried out by means of a plurality of hydrocyclones mounted in series.

Referring to FIG. 1, reaction between sulfuric acid and phosphate rock takes place in a usual reaction section, generally designated 11. The resulting product which is a slurry of impure by-product gypsum in phosphoric acid is transferred via suitable flow means 12 to a filter 13, which may be of the so-called travelling pan type. In filter 13, the acid ($H_3PO_4$) is separated as filtrate from the impure by-product gypsum. In the travelling pan type filter, filtration can be carried out stage wise so that maximum strength and quantity of acid is recovered.

In the system illustrated, filtrate from the first filter section is discharged via suitable conduit means 14 to further processing. As gypsum proceeds along the filter it is subjected to a counter-current washing action, the wash liquor being supplied via a suitable conduit 16 from a clarifier 17. As hereinafter discussed, such wash liquor is, in accordance with the invention, water discharged from hydraulic classification and contains significant quantities of soluble $P_2O_5$. Such wash water gives a final wash to gypsum cake on filter 13, is recycled via suitable conduit 18 to provide an intermediate wash liquor on such filter and is finally recycled via a suitable conduit 19 to reaction station 11 where phosphate rock is reacted with sulphuric acid to yield production phosphoric acid. In this manner, a substantial saving in $P_2O_5$ is effected with a resultant increase in the production of phosphoric acid. At the same time, the recycle of liquor returns phosphoric acid to the acid section and thus the hydraulic classification also acts as a secondary acid recovery medium in that it washes residual acid from the gypsum. This increases overall acid recovery and at the same time obviates the necessity for hot washing of the by-product gypsum.

Filter cake discharged from filter 13 comprises impure by-product gypsum which, as hereinbefore discussed, contains both foreign impurities as well as extremely fine gypsum crystals. Such gypsum cake is transferred via any suitable means, generally indicated by flow line 21, to a repulper tank 22 in which it is repulped with a suitable liquor to form a slurry of proper consistency to enable hydraulic classification. Such repulping liquor may be separately added by means not shown, or it may comprise the effluent liquor from a second stage hydrocyclone 23 transmited via conduit 24 to tank 22, or it may be a portion of clarified liquor from clarifier 17 transmitted via a suitable conduit 26 (shown in dotted lines).

In a preferred arrangement, such wash liquor comprises effluent from a second stage hydrocyclone as that insures maximum economy of water. If additional liquor is required for repulping, it is most economically furnished from clarifier 17.

As noted, the gypsum should be repulped to a slurry of proper consistency for subsequent hydraulic classification. Usually the impure gypsum filter cake contains about 25% to 35% by weight moisture. To this cake, in repulper 22, sufficient liquid is added to yield a slurry of a consistency of from about 13 to 25 percent by weight solids. In this connection, it is to be noted that dilution of the repulped gypsum will vary with each individual case according to the proportion of fine gypsum particles and impurities present. In general, dilution should be such that the suspension shows free settling characteristics. For gypsum, this usually means a water to solids ratio (by weight) of from 3:1 to 6.5:1 depending on the size of the calcium sulfate crystals, the higher dilutions being required where inadequate particle size control in the acid reaction section yields smaller calcium sulfate crystals.

Repulped gypsum slurry is removed from repulper 22 via a suitable conduit 27 and pump 28 for introduction under pressure via conduit 29 into a first hydrocyclone 31 in which hydraulic classification and cleansing occur. Effluent or overflow from hydrocyclone 31 contains impurities as well as fine gypsum crystals and is discharged via a suitable conduit 32 into clarifier 17 for separation and discard of the solids.

Underflow from hydrocyclone 31 contains principally pure gypsum crystals of proper size. However, there may still be residual impurities and soluble phosphates contained in such underflow. In order to increase the degree of purification of the gypsum, the underflow from hydrocyclone 31 is discharged via a suitable conduit 33 into a second repulper tank 34 where it is mixed with wash water supplied via suitable conduits 36 and 37 to yield a slurry of proper consistency for a second hydraulic classification treatment. As in the case of the first hydraulic classification, the slurry consistency should be controlled to enable efficient operation in the second stage hydrocyclone 23.

It will be noted that repulping water may be supplied to the second repulper 34 from two sources. However, the preferred source is filtrate from final filter 38 and only make up water is added in addition.

Slurry is discharged from repulper 34 via a suitable conduit 39, passes through a pump 41 and is delivered via a conduit 42 at a proper operating pressure to the second stage hydrocyclone 23 where it is subjected to a further washing and classification. Such second action substantially removes residual impurities which discharge in the effluent or overflow fraction via conduit 24. The underflow fraction from hydrocyclone 23 contains substantially pure calcium sulfate and is transferred via conduit 43 to final filter 38 for dewatering.

Since the gypsum is substantially free from fine impurities and slimes, its filterability is greatly increased and it is readily dewatered on filter 38 to a cake of less than about 20% moisture. Also, such gypsum has been thoroughly washed hence wash water is not required on the final filter. In this connection it is noted that both the effluent or overflow from first stage hydrocyclone 31 and the final filtrate delivered by filter 38 may contain soluble $P_2O_5$. Consequently its retention in the system not only economizes on water but also prevents loss of soluble $P_2O_5$, the latter being eventually recycled to the acid reaction section 11 as hereinbefore discussed.

As indicated by flow line 44, pure sized gypsum cake, washed and dewatered, is discharged from filter 38 to further processing by reaction with ammonium carbonate to produce ammonium sulfate. Since the gypsum is pure and conveniently sized to remove fines, the calcium carbonate precipitate subsequently formed by reaction of the gypsum with ammonium carbonate, shows a uniform, relatively coarse particle size, rendering possible easy filtration of the gypsum conversion slurry and proper dewatering of the calcium carbonate cake to a low moisture content.

Figure 2:
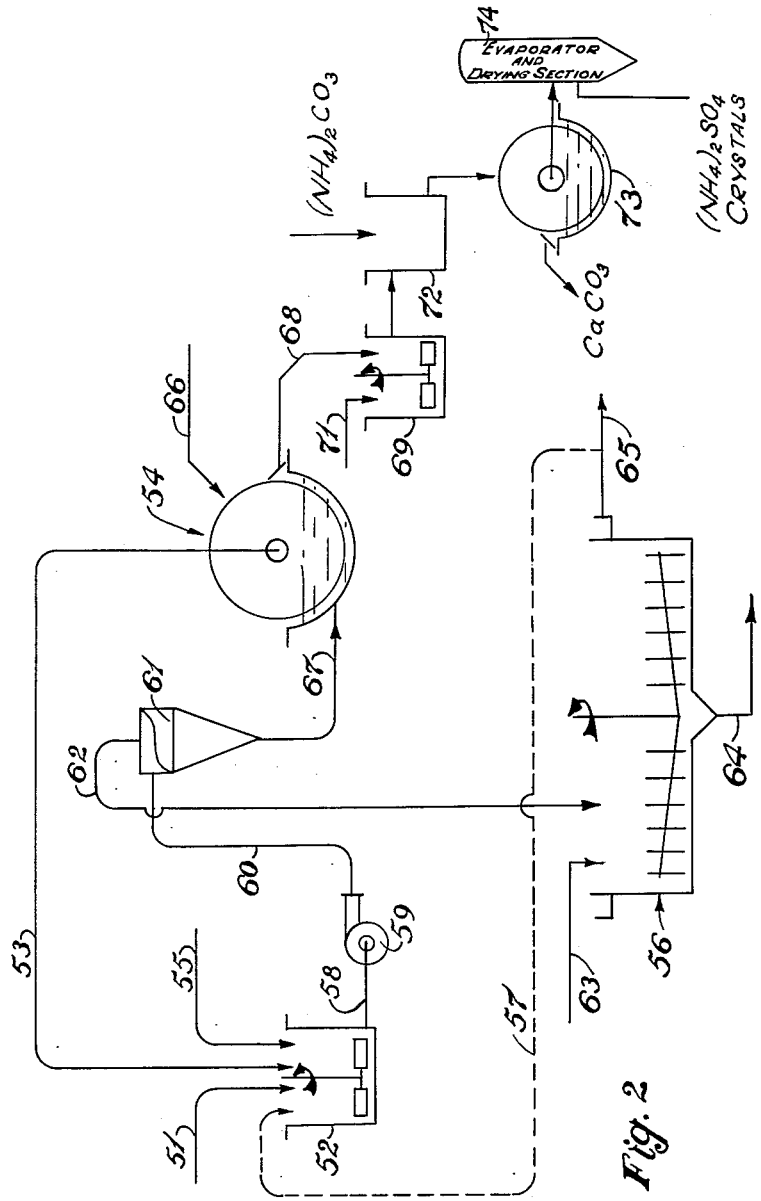
FIGURE 2 illustrates another embodiment of the invention in which the classification is carried out in a single hydrocyclone.

FIGURE 2 illustrates a modification of the invention in which a single hydraulic classification is employed. Clarified wash liquor is recycled to the acid reaction station as in the system of FIGURE 1. As hereinafter explained, soluble $P_2O_5$ in the liquors may be utilized as an aid in clarifying such liquors.

In the system illustrated, impure gypsum filter cake from the phosphoric acid section (not shown) is supplied as indicated by flow line 51 to a repulper tank 52 where it is mixed with sufficient liquor to produce a slurry of desired consistency. As indicated by flow line 53, such liquor comprises primarily filtrate from filter 54 and only make up water is added from outside as indicated by flow line 55. If desired, repulping liquid may be added directly from final clarifier 56 as indicated by dotted line 57.

After repulping, gypsum slurry is discharged as indicated by flow line 58 into a pump 59 which delivers it, as by flow line 60, under pressure to a hydrocyclone 61 where solid impurities are removed along with fine gypsum crystals and discharged as overflow (flow line 62) into clarifier 56.

To insure rapid and complete settling of fine, particularly colloidal, solids in the clarifier, the soluble $P_2O_5$ content of the liquor may be employed as an aid in coagulation. In this connection, it will be remembered that such soluble $P_2O_5$ was carried into the system in the impure gypsum from the phosphoric acid section and removed by washing action of the liquor used in classification. In accordance with a particular feature of the invention, lime is added to clarifier 56 where it reacts with soluble $P_2O_5$ therein to form a tri-calcium phosphate precipitate which coagulates colloidal impurities into rapidly settleable particles or flocs. Such lime addition is schematically indicated by flow line 63. In connection with the lime addition it is to be noted that 100% $P_2O_5$ removal is not required, but only sufficient lime need be added to attain the desired flocculating effect. The clarified liquor with residual $P_2O_5$ in solution may be returned to process.

Settled solids are discharged in a usual manner from the clarifier (flow line 64) while clarified liquor is cycled (flow line 65) to the acid section for use as wash water as described in connection with FIGURE 1. Wash water for filter 54 may be supplied from an outside source as indicated by flow line 66.

Gypsum from which solid impurities and undersized particles have been removed is discharged, as indicated by flow line 67, in the hydrocyclone underflow to filter 54 for final washing and dewatering. The resulting washed and dehydrated filter cake is discharged, as indicated by flow line 68 to further processing by reaction with ammonium carbonate to produce ammonium sulphate.

Although the invention has been described herein with particular reference to installations embodying a hydrocyclone as the hydraulic classification device, it is to be understood that the invention is not to be limited to any specific type device since it may be and has been tested successfully in other types of hydraulic classifiers. As previously noted, the basic discovery upon which the invention is predicated is that by hydraulic classification there is obtained the unexpected removal of solid fluorine compounds simultaneously with slimes and other solid impurities as well as undersize calcium sulphate crystals.

By hydraulic classification, as the term is employed in this specification, is meant those methods of separation where hydraulic, rather than mechanical, forces effect the classification due to differences in specific gravities and sizes which contribute to differences in settling rates, and a liquid stream is the settling medium. Such methods can be carried out in several ways including tanks through which liquid upflows at controlled velocities thus allowing heavy particles to settle against the uprising stream while fine particles are carried along with such stream. Another form of hydraulic classifier is the hydrocyclone mentioned below.

The hydrocyclones described in connection with the drawing are well known in the art. Briefly such a device comprises a conical section having an outlet for the coarse fraction at its apex, a central axially aligned fine fraction outlet in its base, and a tangential feed inlet adjacent such base. Feed is tangentially introduced into such a device under suitable pressure, and spirals at decreasing radii and increasing rotational speed toward the apex. Adjacent such apex an inner column or vortex is formed which spirals toward and out the axially aligned base outlet.

During passage through such a hydrocyclone heavier particles migrate to the periphery of the cone and eventually discharge from its apex while lighter particles migrate to the vortex and are discharged from the base outlet.

As previously indicated, the field of this invention is the treatment of by-product gypsum from the wet phosphoric acid process to remove impurities, particularly solid fluorine compounds formed from the fluor-apatite content of the original phosphate rock, to thereby condition such gypsum for subsequent conversion to ammonium sulfate by reaction with ammonium carbonate. To that end then the invention includes such subsequent reaction in combination with its particular processing steps.

The general scheme for converting gypsum to ammonium sulfate is indicated in the flowsheet of FIG. 2 where the washed gypsum filter cake is transferred via suitable means 68 into a repulper 69 where it is mixed with water added via conduit 71. The resulting suspension is then transferred to a reaction chamber 72 where it is reacted with ammonium carbonate solution to yield a calcium carbonate precipitate and ammonium sulfate in solution. The calcium carbonate is filtered out in a filter 73, the calcium carbonate cake being removed from process while the ammonium sulfate solution (filtrate) is sent on to an evaporator 74 for recovery of ammonium sulfate crystals.

*Example*

A typical by-product gypsum from the wet acid process has the following proximate analysis:

| | Percent |
|---|---|
| Calcium sulfate dihydrate | 95.62 |
| Unattacked residual phosphate | 1.40 |
| Iron and aluminum oxide | 0.19 |
| Magnesium oxide | 0.03 |
| Silica | 0.74 |
| Insoluble fluosilicates | 1.25 |
| Organic matter | 0.41 |
| Soluble residual $P_2O_5$ | 0.36 |

Of the impurities noted, the unattacked phosphate rock has no signficant effect on subsequent reactions, however, all other impurities listed exert, in varying degrees, a detrimental effect on the conversion of gypsum to ammonium sulfate and, since they are present mainly as colloidal particles, adversely affect filtering of the ammonium sulfate.

In a simplified test, such a by-product gypsum filter cake was diluted in a repulper to a concentration of about 200 gr./liter solids (5:1 by weight water to solids ratio) and the resulting suspension subjected to a washing and classifying action in a hydraulic classification system employing hydrocyclones. To accomplish this, the suspension was first passed through a single hydrocyclone where a coarse separation was made with particles coarser than about 74 microns reporting as apex discharge (underflow) and finer particles being carried out in the overflow.

The overflow, containing primarily particles less than 74 microns in size and including most of the undesired impurities as well as some product size gypsum, was then passed through a series of hydrocyclones where a finer separation was made with particles smaller than 40 microns reporting as the fine overflow and coarser particles as underflow. All cyclone underflows were then combined, diluted, repulped and passed through another hydrocyclone for further washing. The washed underflow was then filtered to recover the washed and sized gypsum. Overflow liquor from the cyclones as well as the filtrate was clarified to remove fine colloidal particles and the clarified liquor returned to process.

Operating in the manner described resulted in removal of about 75% of insoluble fluosilicates, 85% clayey material and substantially complete removal of organic matters and soluble $P_2O_5$. The resulting filter cake was substantially pure, comprising 97.5% to 98%

$CaSO_4 \cdot 2H_2O$ (dry basis) and was readily filtered to a cake containing only 22% to 24% water by weight. The mesh of separation selected (i.e. 74 microns) was based on the size of gypsum crystals desired in the overflow and underflow.

I claim:

1. In the wet phosphoric acid process which includes the steps of reacting phosphate rock with sulfuric acid in a first reaction station to yield a slurry of by-product gypsum solids in liquid phosphoric acid and filtering such slurry at a filtration station to recover phosphoric acid as filtrate and impure by-product gypsum as filter cake, said gypsum containing residual soluble $P_2O_5$; an improved method of treating said by-product gypsum to remove impurities and to recover residual $P_2O_5$ therefrom, said improvement comprising the steps of removing such filter cake from the filtration station, repulping said cake with liquor to form a suspension having free settling characteristics while effecting removal of soluble $P_2O_5$ from said cake by dissolving said $P_2O_5$ in said liquor, subjecting said suspension to hydraulic classification to yield an overflow fraction comprising fine solid impurities suspended in one portion of such $P_2O_5$ bearing liquor and an underflow fraction comprising substantially pure gypsum suspended in another portion of such liquor, recovering substantially pure gypsum from said underflow fraction, separating said fine solid impurities from said overflow fraction to yield a substantially solids-free liquor containing soluble $P_2O_5$, transferring said solids-free liquor to said filtration station and there passing it through said impure gypsum filter cake to wash the same thereby to effect recovery of residual phosphoric acid, and then flowing the resulting filtrate containing $P_2O_5$ and phosphoric acid-bearing liquor to the first reaction station for further reaction with sulfuric acid.

2. In the wet phosphoric acid process which includes the steps of reacting phosphate rock with sulfuric acid in a first reaction station to yield a slurry of by-product gypsum solids in liquid phosphoric acid and filtering such slurry to recover phosphoric acid as filtrate and impure by-product gypsum as filter cake, and wherein said impure by-product gypsum contains residual soluble $P_2O_5$; an improved method of treating said by-product gypsum to remove impurities and to recover residual $P_2O_5$, said improvement comprising the steps of removing filter cake from said filtering step, repulping said cake with liquor to form a suspension having a consistency to enable hydraulic classification of said cake and simultaneously effect removal of soluble $P_2O_5$ from said cake by dissolving said $P_2O_5$ in said liquor, subjecting said suspension to hydraulic classification to yield an overflow fraction including solid impurities in one portion of said $P_2O_5$ bearing liquor and an underflow fraction comprising substantially pure sized gypsum suspended in another portion of said $P_2O_5$ bearing liquor, separating said pure sized gypsum from said underflow fraction and returning said liquor bearing $P_2O_5$ for repulping said filter cake, separating said impurities from said overflow fraction and recycling said liquor bearing $P_2O_5$ as wash for said filtering step.

3. A process of treating by-product gypsum from a wet phosphoric acid process to remove contaminating solids and residual $P_2O_5$ prior to conversion thereof to ammonium sulphate; comprising pulping said by-product gypsum with a suitable liquor to form a suspension having a consistency to enable hydraulic classification of said suspension, hydraulically classifying said suspension to separately remove a solids impurities fraction including fine gypsum solids and a sized gypsum fraction uncontaminated by fine gypsum and foreign solids, separating said sized gypsum from said fraction to recover residual $P_2O_5$, and reacting said sized gypsum with ammonium carbonate to produce ammonium sulfate.

References Cited in the file of this patent

UNITED STATES PATENTS

| | | |
|---|---|---|
| 1,902,649 | Larsson | Mar. 21, 1933 |
| 2,384,856 | Ten Eyck et al. | Sept. 18, 1945 |
| 2,485,164 | Peirce | Oct. 18, 1949 |
| 2,731,147 | Krebs | Jan. 17, 1956 |